3,361,704
PROCESS FOR MAKING MATTE SURFACES
Calvin J. Benning, Clarksville, and Christian B. Lundsager, Ashton, Md., assignors to W. R. Grace & Co., New York, N.Y., a corporation of Connecticut
No Drawing. Filed Sept. 10, 1965, Ser. No. 486,548
17 Claims. (Cl. 260—33.6)

This invention relates to poly(alpha-olefins). In one specific aspect, this invention relates to a process for converting glossy surfaces of sheets, or films, prepared from compositions consisting essentially of crystalline high molecular weight poly(alpha-olefins) blended with fillers and plasticizers, which also function as "extenders," to matte surfaces.

In summary, this invention relates to a process for preparing matte surfaces on film prepared from homogeneous blends consisting essentially of about 10–50% poly(alpha-olefins) prepared from the group consisting of ethylene and mixtures of ethylene and alpha-olefins having up to about 6 carbon atoms, said poly(alpha-olefins) having a high load melt index of about 0–3 and a density of about 0.94–0.96 g. per cc., about 30–80% inert particulate filler, and about 10–60% plasticizer; said process consisting of heating said films to a temperature between about 45° C. and a temperature about 5° C. below the softening point of the poly(alpha-olefin) polymer for about 5–90 minutes and cooling said film below about 30° C., whereby the surfaces of the aforesaid film become matte.

By "glossy surface" we mean a surface giving a reading higher than about 7.2 on a Gardner gloss meter according to ASTM C346–59.

By "matte surface" we means a surface giving a reading lower than about 7 on a Gardner gloss meter according to ASTM C346–59.

All readings on the Gardner gloss meter are made at ambient temperature (ca. 20–26° C.) and the axis of the incident beam is 45° from the perpendicular to the specimen surface.

The term percent (%) when used herein, unless otherwise defined where used, means percent by weight. All mesh and screen sizes referred to herein are U.S. Standard unless otherwise specified. Densities are expressed in g. per cc.

It has been found that compositions comprising a homogeneous blend consisting essentially of about 10–50 percent poly(alpha-olefins) (prepared from ethylene or from mixtures of ethylene and other alpha-olefins, having up to 6–8 carbon atoms, e.g., alpha-butylenes) having a standard load melt index of substantially zero, about 30–80 percent inert particulate filler material, and about 10–60 percent of plasticizer can readily be converted into sheets, or films, by standard techniques including blowing, calendering, and extruding. The thus produced sheets, or films, have a glossy surface. We have found that the glossy surface of the said sheets, or films, can be readily converted to matte surfaces by heating the sheets, or films, to a temperature of about 45° C. to a temperature which is below the softening point of the polyolefin used in the composition from which the sheet, or film, was prepared and cooling the thus heated film to a temperature below about 30° C. The softening temperatures of these polyolefins vary from about 125 to 137° C. depending upon the molecular structure of the polyolefin. The necessary heating time depends upon the temperature. Said heating time ranges from about 1–1½ hours at about 45° C. to about 5–12 minutes at the upper temperature range which is about 90–110° C. We prefer to use temperatures of about 50–70° C. with exposure times of about 15–60 minutes. Various heat sources can be used; for example, convection currents (which can be generated by heating air or other gas with steam coils, electric heaters, gas burners, and the like) can be passed over the surfaces of the glossy sheets, or films. Another source of heat which gives excellent results is infrared radiation; for example, infrared lamps or infrared radiation from a high temperature source such as a heated sheet, or block, of metal or even from the sun. Other heat sources will be readily apparent to those skilled in the art.

It has been found that poly(alpha-olefins) of high molecular weight, e.g., ca. 250,000 or higher, can tolerate very high filler loadings without becoming brittle. This is quite unlike conventional poly(alpha-olefins) having molecular weights of about 25,000–200,000 which yield brittle products at relatively low filler concentrations. It has also been found that plasticizers can be incorporated into blends of these high molecular weight polymers with filler to provide good flow characteristics and to facilitate mixing or extrusion without causing excessive loss of strength. It has also been found that flexible films, or sheets, can be produced at low cost from a unique three-component system consisting essentially of: (a) high molecular weight poly(alpha-olefins); (b) particulate fillers; and (c) plasticizers. Each of the above-listed components is essential for attainment of desired physical properties in the sheets, or films. The high molecular weight polymer confers strength and flexibility on the sheet. Compositions containing high concentrations of high molecular weight crystalline poly(alpha-olefins) generally have superior properties, and poly(alpha-olefins) of extremely high molecular weight can be modified by blending with special polymers such as polystyrene. Plasticizers enhance elongation and flexibility, but their primary role is to increase the melt index, thereby to produce readily processable compositions by facilitating the initial dispersion of fillers into the matrixes. Blends of crystalline high molecular weight poly(alpha-olefins) and plasticizers are generally incompatible (with the result that under ordinary conditions plasticizer exudes from the composition). The use of inorganic fillers is essential because these fillers prevent or inhibit the plasticizers' exuding from the compositions at normal temperatures. These fillers are of relatively low cost and thus serve as cheap "extenders" for the far more costly organic component of the composition.

Nearly any finely divided material which retains its particulate characteristic during processing is suitable for use as a filler. While the filler can be either water soluble or water insoluble, we generally prefer to use the water insoluble fillers since they will not wash out if the film is exposed to contact with water—for example rain. The following are examples of water insoluble fillers which have been found to be satisfactory; carbon black, coal dust, powdered graphite, metallic oxides such as those of magnesium, titanium, iron, and the like, metal carbonates especially those of calcium and magnesium, metal silicates and aluminates and naturally occurring clays and clay-like materials such as kaolin, attapulgite, china clay, mica, talc, vermiculite, and the like. Water soluble fillers can be used for special effects such as the preparation of porous materials by dissolving the filler with water. Examples of water soluble fillers are salt, sugar, potassium chloride, ammonium phosphates, ammonium sulfate, and potassium phosphates. Various other fillers will be readily apparent to those skilled in the art. The diameter of the filler particles must not exceed about 20–24 microns when making sheets, or films, about 0.001 inch in thickness nor about 10–12 microns when making films about 0.0005 inch in thickness. Obviously, the diameter of the filler particles can be greater when making thicker sheets, or films. Thus, when making sheets about 0.008 inch thick, the filler particles can have a diameter up to about 160–190 microns. If the filler particles are too large they tend to project outward from the surfaces of the sheet, or film, making the sheet uneven and giving it a rough appearance.

By "plasticizer" is meant a material which performs the following functions: (a) improves the processability of the composition, i.e., lowers the melt viscosity and reduces the amount of power imput which is required to compound and to fabricate the composition; and (b) improves the flexibility of the final composition. Plasticizers may be water soluble or water insoluble; however, we generally prefer to use water insoluble plasticizers because they will not wash out if the film is exposed to rain or to water from another source. Water soluble plasticizers can be used for special effects. For example, a plasticizer-free film or sheet can be prepared by extracting a sheet, made from a composition based on a water soluble plasticizer, with water. Among the plasticizers which have been found to be desirable for this use are esters such as the phthalates, stearates, adipates, hydrocarbon petroleum oils, waxes, resins, chlorinated hydrocarbons, chlorinated waxes, polystyrene, syrups such as honey and corn syrup, glycerol and other polyols, tall oil, and drying oils such as linseed oil. It is possible to mix one or more of the above plasticizers and obtain very excellent results; however, we prefer to use hydrocarbon oil. We have obtained our best results when treating sheets, or films, prepared from compositions prepared with petroleum hydrocarbon oil plasticizers. Excellent results have been obtained with the following hydrocarbon oils:

| Name of Oil | Percent Paraffinic Hydrocarbon | Percent Naphthenic Hydrocarbon | Percent Aromatic Hydrocarbon | Viscosity Seconds, Saybolt Universal |
|---|---|---|---|---|
| Fisher Heavy Oil [1] | ca. 100 | | | 335–350 at 100° F. |
| Shellflex 310 [2] | 62 | 34 | 4 | 256 at 100° F. |
| Shellflex 412 [2] | 50 | 43 | 7 | 559 at 100° F. |

[1] From Fisher Scientific Co.
[2] From Shell Oil Co.

We have found that sheets, or film, having glossy surfaces which are readily converted to matte surfaces when treated according to the method of our invention can be made from high molecular weight polyethylene or from high molecular weight copolymers of ethylene and alpha-butylenes having a standard load (2,160 g.) melt index of about zero, a high load (21,600 g.) melt index of about 0 to 3.0, and a density (ASTM D792–64T or ASTM D1505–63T) of about 0.94 to 0.96. However, for best results we prefer to use sheet, or film, which was prepared from high molecular weight polyethylene or from a copolymer of polyethylene and alpha-butylenes having a standard load melt index of zero, a high load melt index of about 0.1–1.5 and a density of about 0.942–0.955 g. per cc.

Excellent results have been obtained with sheet, or film, prepared from a composition in which the filler was calcium carbonate or kaolin clay, or finely divided silica, or zinc oxide, or finely divided carbon black, or titanium dioxide, or a mixture of two or more of these materials.

The "melt index" of a poly(alpha-olefin) is a measure of flow at standard conditions of temperature and pressure (ASTM D1238–52T). The rate of extrusion in g. per 10 minutes is the melt index, and it is used to indicate the average molecular weight of the polymer. The lower the molecular weight of the polymer, the more rapidly it extrudes; hence, the melt index increases as molecular weight decreases. By "high-load melt index" is meant the melt index determined by the procedure of ASTM D1238–57T using a weight of 21,600 g. A weight of 2,160 g. is used when determining the "melt index." The "melt index" and "high load melt index" of ethylene polymers and copolymers of ethylene with other alpha-olefins are measured at 190° C.

It has been found that the following procedure is satisfactory for mixing the polyolefin with filler and plasticizer. The various components (polyolefin, filler, and plasticizer) are premixed at room temperature in a V-blender. The poly(alpha-olefin)-filler-plasticizer "dry blends" are then transferred to a suitable mixer and preheated to about 160–170° C. to "soften" the blend. The thus softened blend is mixed thoroughly in a conventional blender and processed, by standard extrusion or blowing techniques into sheet, or film, of the desired thickness. Other processing techniques will be readily apparent to those skilled in the art.

We have found that sheets, or films, made from the above-described blend have glossy surfaces which are objectionable for many uses due to glare produced by light reflected from the glossy surfaces. For example, glossy surfaced examination gowns (for use in physicians' offices and in hospitals) and surgical drapes are unacceptable. Glossy surfaces on black sheeting used as wall covering and drapes over doors and windows of photographic darkrooms are unsatisfactory because light reflected from the glossy surfaces can fog film. Other uses for which glossy surface sheets, or films, are unsatisfactory will be readily apparent to those skilled in the art. Hence, our method of treating the aforesaid sheets, or films, makes it possible to prepare highly useful products from sheets, or films, which would otherwise give objectionable or unsatisfactory products.

We have found that films and sheets with matte surfaces prepared by the process of our invention have many uses. For example, black film or sheeting prepared by the process of our invention is excellent for use in preparing darkrooms for photographic purposes. The black sheeting which may be prepared from carbon black filled, or graphite filled, or coal filled sheet, or film, can readily be attached to walls and doors to give a very excellent surface face for photographic darkrooms. This film can also be laminated onto paper, or wood, or the like, to make boxes and similar containers. Black sheeting with matte surfaces can also be draped over windows and doorways of photographic darkrooms to keep out light. This material is excellent for making temporary darkrooms in tents, and the like, for use by vacationist, hobbyist, and for military operations. Lighter colored film or sheet, for example, that filled with clay (which may have beige color) or that filled with calcium carbonate (which will be white) having a matte surface are excellent materials for making drapes for use about the home. Also, excellent examination gowns for use in hospitals and physicians' offices may be made from this material. We have found that examination gowns made of a matte surface film are much less annoying to patients wearing them than are gowns having glossy or shiny surfaces. Matte surfaced white (e.g., calcium carbonate filled) sheets or films made by the process of our invention make excellent drapes for use in surgery. These materials are inexpensive and can be burned without melting after use. Since the surface is matte, these drapes do not reflect light into the eyes of the surgeon and are therefore most advantageous in the operating room. Sheets or films with matte surfaces prepared by the method of our invention can be laminated to cloth to make rain gear for use in cold weather, for making tents suitable for military and civilian use in cold areas, and for similar purposes. Such laminated materials are most useful in cold areas because the matte surfaces absorb more infrared radiation than do materials with glossy surfaces, thereby conserving heat. Other uses for sheets and films having matte surfaces will be readily apparent to those skilled in the art.

Our invention is illustrated further by the following examples which are illustrative only and which are not intended to limit the scope of the invention.

*Example 1*

The results of this example show the advantage of the matte surface sheeting, or film, of our invention as a cover, or mulch, for seed beds.

Strips of 4 different types of plastic (filled plasticized polyethylene) sheeting (each strip was about 30 inches wide, 0.001 inch thick, and 200 feet long) were placed, side-by-side on a plowed field which had recently been harrowed and planted with cotton seeds (no seeds had germinated when the plastic was laid). The following afternoon, when the ambient temperature was about 88° F. (31° C.) the temperature of the ground under each strip was measured using a conventional procedure (a thermocouple and conventional auxiliary apparatus). The temperatures which were observed are presented in the following table.

| Position of Thermocouple | Type of Plastic Sheet | | | | |
|---|---|---|---|---|---|
| | None (Control) | White With Matte Surface a b | Brown With Matte Surface a c | Black With Matte Surface a d | Black With Glossy Surface e |
| | Temperature, ° C., Using Plastic Sheets as Mulch | | | | |
| On Surface of Soil, Just Beneath Plastic Sheet | 31 | 46 | 49 | 49 | 41 |
| One Inch Beneath Surface of Soil | 29 | 34 | 36 | 36 | 31 |
| Two Inches Beneath Surface of Soil | 24 | 30 | 31 | 31 | 28 | a The matte surfaces of this sheet were prepared by heating and then cooling the sheet according to the method of our invention.
b This material gave a reading of 2.4 on a Gardner gloss meter according to ASTM C346-59.
c This material gave a reading of 2.8 on a Gardner gloss meter according to ASTM C346-59.
d This material gave a reading of 0.7 on a Gardner gloss meter according to ASTM C346-59.
e This sheet was made from conventional low density polyethylene containing about 1.5% ultraviolet stabilizer grade carbon black. This material gave a reading of 38.5 on a Gardner gloss meter according to ASTM C346-59. Heating a test sample of this material for about 10 minutes at 80° C. did not reduce the reading on the Gardner gloss meter.

The functions of a mulch are to increase soil temperature, keep down the growth of weeds, retard the loss of water from the soil by evaporation, and prevent the crusting of the surface of the soil. Since the 4 plastic mulches tested were substantially equal in all of the above-listed functions *except* increasing the soil temperature, it is readily apparent from the data reported in the above table that the matte surface plastic sheeting of our invention, when used as an agricultural mulch, is superior to ordinary glossy surface sheeting. It is also evident that our dark colored (brown or black) matte surface sheeting, when used as a mulch, is superior in this respect (soil temperature) to our white matte surface sheeting.

*Example II*

A formulation of 20 parts of high molecular weight polyethylene having a high load melt index of 1.2 and a density of about 0.95, 56 parts of powdered kaolinite clay having an average diameter of about 8-10 microns, and 24 parts of hydrocarbon oil (Shellflex 412) was mixed in a Hobart mixer (large scale dry blender) with 4 parts of powdered high tinting strength titanium dioxide having an average diameter of about 1-2 microns. The powdery blend (a total weight of 20 pounds) was melt blended in a small Banbury mixer (intensive mixer) at about 400° F. for 3½ minutes. The molten polymer mixture was worked into a sheet ⅛ inch thick using a two roll mill at about 320° F. The resulting sheet was ground on a Wiley-Mill through a 5 mesh screen. The ground blend was extruded into a ⅛ inch rod and pelletized on a 1 inch National Rubber Machinery plastic extruder. The barrel of said extruder had a length to diameter ratio of 20:1 and the screw configuration of this extruder was that of a conventional polyethylene metering screw with a 3.5:1 compression ratio.

The same extruder was then fitted with a 2 inch blown film die and the pellets obtained previously were re-extruded to form a tube which was inflated and slit to produce a sheet of plastic film. The temperature of the extruder ranged from about 325° F. at the hopper section to about 300° F. near the exit end. The temperatures on the die was about 290° F. The extruder speed was about 50 r.p.m. The take-off speed of the film varied from about 2–12 feet per minute.

The thus produced film had a glossy appearance and gave a reading of about 23 on the Gardner gloss meter. Heating this film to about 50° C. for about 20–25 minutes in a laboratory drying oven and subsequently cooling the thus heated film to about 20° C. reduced the reading on the gloss meter to about 5. The treated film no longer appeared glossy. Similar results were obtained by heating a strip of the film to about 45° C. for about 1–1½ hours and cooling the thus heated strip to about 25° C.

*Example III*

A mixture of 20 parts of high molecular weight polyethylene having a high load melt index of 1.8 and a density of 0.95 plus 60 parts of calcium carbonate (Purecal "O") having an average particle diameter of about 1–3 microns and 20 parts of hydrocarbon oil (Shellflex 412) was mixed in a Ribbon blender for 20 minutes. The powdery blend (two 50 pound batches) was extruded as rods using a Ko-Kneader (reciprocating twin screw extruder at 350° F.). The rod was chopped into ⅛ inch pellets on a Cumberland pelletizer and dried at 60° C. for 24 hours. The dried pellets were fed into a 2½ inch National Rubber Machinery extruder having a barrel length to diameter ratio of 24:1 and a constant metering polyethylene screw with a compression ratio of 3.4:1. The extruder was fitted with a 2 inch streamlined film die. The temperature of the extruder varied from about 360° F. at the hopper section to about 310° F. at the exit end. The temperature on the die was about 290° F. The extruder speed was about 20 r.p.m. and the pressure was about 1750 p.s.i.g. The take-off speed for the film was 20 feet per minute. The film was about 0.001±0.0002 inch thick and 17 inches wide.

The thus produced film gave a reading of about 22.7 on the Gardner gloss meter. When a strip of this film was heated to about 100° C. for about 10 minutes in an electrically heated oven and then cooled to ambient temperature (ca. 25° C.) the reading was 4.5.

A similar result was obtained by heating a strip of this film to about 100° C. for about 5–8 minutes with a current of hot air and cooling the thus heated strip to about 15° C. Also, a substantially similar result was obtained by heating a strip of the film to about 45° C. for about 60 minutes with radiation from an infrared lamp and then cooled to about 29° C. The surfaces of the unheated film had a definitely glossy appearance while in all instances the surfaces of film strips which had been heated to about 45° C. or higher and then cooled to below about 30° C. lost their glossy appearance immediately upon cooling below about 30° C., and in every instance the Gardner gloss meter reading was below about 7 when the heated sheet, or film, had been cooled below about 30° C.

Similar results were obtained with film made by the above-described process but substituting Fisher Heavy Oil for Shellflex 412.

Excellent results have also been obtained with films made from compositions prepared with hydrocarbon oil plasticizers having viscosities of about 200–800 and 500–600 seconds, Saybolt Universal at 100° F.

When preparing compositions for making films, the quantities of the individual components (poly(alpha-olefin), filler, and plasticizer) always add up to 100%. Thus, if 80% filler is used, 10% plasticizer and 10% poly(alpha-olefin) must be used. Likewise, if 60% plasticizer is used, 30% filler and 10% poly(alpha-olefin) must be used. If 50% poly(alpha-olefin) is used, the remaining 50% consists of filler and plasticizer within the permitted amounts, e.g., at least 30% filler (but not more than 40%), and at least 10% plasticizer (but not more than 20%).

The term "parts" (i.e., parts of polyethylene, parts of filler (e.g., clay, titanium dioxide, and calcium carbonate), and parts of hydrocarbon oil plasticizer) used in Examples II and III and in the claims means parts by weight.

What is claimed is:

1. A process for preparing matte surfaces on film prepared from homogeneous blends consisting essentially of about 10–50% poly(alpha-olefins) prepared from the group consisting of ethylene and mixtures of ethylene and alpha-olefins having up to about 6 carbon atoms, said poly(alpha-olefins) having a high load melt index of about 0–3 and a density of about 0.94–0.96 g. per cc., about 30–80% inert particulate filler, and about 10–60% plasticizer; said process consisting of heating said films to a temperature between about 45° C. and a temperature about 5° C. below the softening point of the poly(alpha-olefin) polymer for about 5–90 minutes and cooling said film below about 30° C., whereby the surfaces of the aforesaid film become matte.

2. A process for preparing matte surfaces on film prepared from homogeneous blends consisting essentially of about 10–50% poly(alpha-olefins) prepared from the group consisting of ethylene and mixtures of ethylene and alpha-olefins having up to about 6 carbon atoms, said poly(alpha-olefins) having a high load melt index of about 0–3 and a density of about 0.94–0.96 g. per cc., about 30–80% inert particulate filler selected from the group consisting of calcium carbonate, magnesium carbonate, kaolin clay, titanium dioxide, ferric oxide, carbon black, and mixtures thereof, and about 10–60% of plasticizer selected from the group consisting of polystyrene, hydrocarbon oil, esters, drying oils, and mixtures thereof; said process consisting of heating said films to 35–110° C. for about 5–90 minutes and cooling said film below about 30° C., whereby the surfaces of the aforesaid film become matte.

3. A process for preparing matte surfaces on film prepared from homogeneous blends consisting essentially of about 10–50% of high molecular weight polyethylene having a high load melt index of about 0–3 and a density of about 0.94–0.96 g. per cc., about 30–80% inert particulate filler selected from the group consisting of calcium carbonate, magnesium carbonate, kaolin clay, titanium dioxide, ferric oxide, carbon black, and mixtures thereof, and about 10–60% of hydrocarbon oil plasticizer, said oil having a viscosity of about 200–800 seconds, Saybolt Universal at 100° F.; said process consisting of heating said films to 35–110° C. by exposing said film to a heat source for about 5–90 minutes and cooling said film below about 30° C., whereby the surfaces of said film become matte.

4. The process of claim 3 in which the heat source is convection currents.

5. The process of claim 3 in which the heat source is a source of infrared radiation.

6. The process of claim 3 in which the filler is a mixture of calcium carbonate and titanium dioxide.

7. The process of claim 3 in which the filler is carbon black.

8. The process of claim 3 in which the filler is kaolinite clay.

9. The process of claim 3 in which the film is heated to about 45–70° C. for about 15–60 minutes.

10. The process of claim 3 in which the plasticizer is a hydrocarbon oil having a viscosity of about 560 seconds, Saybolt Universal at 100° F.

11. The process of claim 3 in which the high load melt index of the polyethylene is 0.1–1.5.

12. A process for preparing matte surfaces on film prepared from a composition consisting essentially of about 12–30 parts by weight of high molecular weight polyethylene having a high load melt index of about 0–3 and a density of about 0.94–0.96 g. per cc., about 54–76 parts by weight of particulate filler selected from the group consisting of clay, carbon black, calcium carbonate, magnesium carbonate, titanium dioxide, ferric oxide, zinc oxide, and mixtures thereof, and about 22–26 parts by weight of hydrocarbon oil plasticizer having a viscosity of about 200–800 seconds, Saybolt Universal at 100° F., said process consisting of heating said film at about 45–95° C., for about 10–60 minutes and cooling said film below about 30° C., whereby the surfaces of the aforesaid film become matte.

13. The process of claim 12 in which the viscosity of the oil is about 500–600 seconds, Saybolt Universal at 100° F.

14. The process of claim 12 in which the high load melt index of the polyethylene is about 0.1–1.5.

15. The process of claim 12 in which the filler is kaolinite clay.

16. The process of claim 12 in which the filler is carbon black.

17. The process of claim 12 in which density of the polyethylene is about 0.942–0.955 g. per cc.

No references cited.

MORRIS LIEBMAN, *Primary Examiner.*

H. H. FLETCHER, *Assistant Examiner.*